(12) United States Patent
Grieve et al.

(10) Patent No.: US 6,929,785 B2
(45) Date of Patent: Aug. 16, 2005

(54) METHOD AND APPARATUS FOR PREHEATING OF A FUEL CELL MICRO-REFORMER

(75) Inventors: Malcolm James Grieve, Fairport, NY (US); David R. Schumann, Spencerport, NY (US); John E. Kirwan, Troy, MI (US); Galen B. Fisher, Bloomfield Hills, MI (US); Ather A. Quader, Sterling Heights, MI (US)

(73) Assignee: Delphi Technologies, Inc., Troy, MI (US)

( * ) Notice: Subject to any disclaimer, the term of this patent is extended or adjusted under 35 U.S.C. 154(b) by 1036 days.

(21) Appl. No.: 09/782,621

(22) Filed: Feb. 13, 2001

(65) Prior Publication Data

US 2002/0110507 A1 Aug. 15, 2002

(51) Int. Cl.[7] .............................................. F28D 21/00
(52) U.S. Cl. ..................... 422/199; 422/222; 48/127.9; 48/214 A
(58) Field of Search ................................. 422/188, 189, 422/190, 191, 193, 198, 199, 211, 222; 48/75, 118.5, 127.9, 211, 214 R, 214 A

(56) References Cited

U.S. PATENT DOCUMENTS

| | | |
|---|---|---|
| 4,729,931 A | 3/1988 | Grimble |
| 5,143,800 A | 9/1992 | George et al. |
| 6,230,494 B1 * | 5/2001 | Botti et al. .................... 60/649 |
| 6,423,896 B1 | 7/2002 | Keegan |
| 6,464,947 B2 | 10/2002 | Balland |
| 6,481,641 B1 | 11/2002 | Mieney |
| 6,485,852 B1 | 11/2002 | Miller et al. |
| 6,548,197 B1 * | 4/2003 | Chandran et al. ............. 429/17 |
| 6,562,496 B2 | 5/2003 | Faville et al. |
| 6,562,502 B2 | 5/2003 | Haltiner, Jr. |
| 6,608,463 B1 | 8/2003 | Kelly et al. |
| 6,682,841 B1 * | 1/2004 | Armstrong et al. ........... 429/26 |

* cited by examiner

Primary Examiner—Samuel M. Heinrich
(74) Attorney, Agent, or Firm—Paul L. Marshall

(57) ABSTRACT

An apparatus and method for a preheated micro-reformer system is disclosed comprising a reformer and a micro-reformer in fluid communication with the reformer. The micro-reformer being electrically preheatable. An apparatus comprising a micro-reformer including a first zone and a second zone, the first zone being preheatable to a first temperature and the second zone being preheatable to a second temperature, the second temperature being higher than the first temperature.

A method of using a micro-reformer that is electrically preheatable is disclosed comprising initiating an electrically preheatable micro-reformer. The micro-reformer is preheated. The preheating can be accomplished by converting electrical energy into thermal energy. A method of using a preheated micro-reformer is disclosed comprising preheating a first zone, preheating a second zone to a temperature higher than the first zone, vaporizing a fuel air mixture in the first zone, and reforming the fuel air mixture in the second zone.

30 Claims, 2 Drawing Sheets

METHOD AND APPARATUS FOR PREHEATING OF A FUEL CELL MICRO-REFORMER

BACKGROUND

A fuel cell is an energy conversion device that generates electricity and thermal energy by electrochemically combining a gaseous fuel and an oxidant gas. The basic components of a fuel cell structure or stack consist of an electrolyte layer in contact with a porous anode and cathode on either side of the electrolyte layer. Several types of fuel cells currently exist. In one type of fuel cell, the solid oxide fuel cell (SOFC), the fuel cell is constructed from solid-state materials utilizing an ion-conducting oxide ceramic as the electrolyte. Fuel and an oxidant are supplied to the fuel cell unit to generate electricity and thermal energy. A reformer is often used to generate the fuel called a reformate comprising mainly gaseous hydrogen and carbon monoxide from a primary fuel such as diesel fuel or gasoline while the oxidant is taken from an air supply.

In certain applications, the fuel cell will have to operate in multiple start-up and shut down cycles. Rapid start-up and shut down cycles are typical in automobile applications. The reformate supply must in turn be supplied rapidly and at the proper temperature. In order to function rapidly, the reformer must be capable of rapid heat-up cycles. Rapid start-up of a large catalytic reformer is difficult with liquid fuels, such as diesel or gasoline. The large mass of the catalytic reformer is slow to heat, and as a result the initial operation of the reformer is at lower temperatures. The initial low temperature reactions create soot and foul the catalyst during the transition from the initial low temperature operation to the high temperature operation.

SUMMARY

An apparatus and method for a preheated micro-reformer system is disclosed comprising a reformer and a micro-reformer in fluid communication with the reformer. The micro-reformer being electrically preheatable. An apparatus comprising a micro-reformer including a first zone and a second zone, the first zone being preheatable to a first temperature and the second zone being preheatable to a second temperature, the second temperature being higher than the first temperature.

A method of using a micro-reformer that is electrically preheatable is disclosed comprising initiating an electrically preheatable micro-reformer. The micro-reformer is preheated. The preheating can be accomplished by converting electrical energy into thermal energy. A method of using a preheated micro-reformer is disclosed comprising preheating a first zone, preheating a second zone to a temperature higher than the first zone, vaporizing a fuel air mixture in the first zone, and reforming the fuel air mixture in the second zone.

A preheated micro-reformer is disclosed comprising a means for preheating a first zone, a means for preheating a second zone to a temperature higher than said first zone, a means for vaporizing a fuel air mixture in said first zone and a means for reforming said fuel air mixture in said second zone.

The above described and other features will be appreciated and understood by those skilled in the art from the following detailed description, drawings, and claims.

BRIEF DESCRIPTION OF THE DRAWINGS

The reformer system will now be described, by way of an example, with references to the accompanying drawings, wherein like elements are numbered alike in the several figures.

DESCRIPTION OF THE PREFERRED EMBODIMENT

Figure 1:
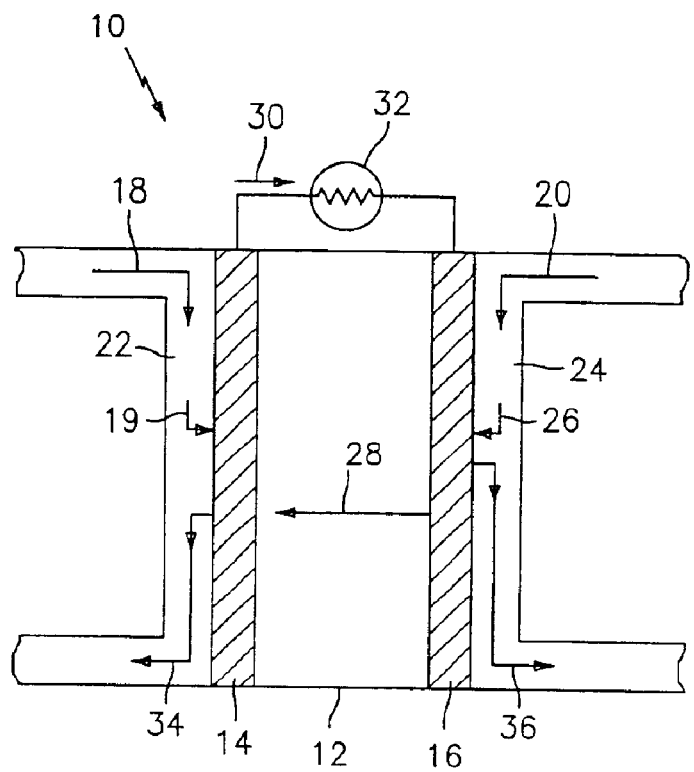
FIG. 1 is a schematic plan view of an exemplary embodiment of a fuel cell unit making up all or part of a fuel cell.

Referring to FIG. 1, an exemplary embodiment of a fuel cell unit 10 is shown. In one embodiment, the fuel cell unit 10 is an assembly of an anode 14 and a cathode 16 with the electrolyte 12 positioned between the anode 14 and the cathode 16, as illustrated. In a working fuel cell, one or more fuel cell units are employable. More than one unit is employed to increase the total energy output of the fuel cell. In such multiple unit fuel cells, fuel cell unit 10 is repeated over and over to provide a serial array of fuel cell units 10 to produce a desired quantity of electrical energy and thermal energy.

In the embodiment shown in FIG. 1, during operation, reformate 18 (typically hydrogen and carbon monoxide reformed from diesel fuel, gasoline, natural gas, propane, methanol or the like), flows through channel 22 and oxidant 20, typically air, flows through channel 24, respectively. The anode 14 is exposed to or contacted with the reformate 18 and the cathode 16 is exposed to or contacted with the oxidant 20. Basically, at the cathode, oxidant 20 reacts with electrons to form oxygen anions 28. The negative ions (anions) 28 migrate across the electrolyte 12. At the anode 14, hydrogen and or carbon monoxide 19 taken from the reformate 18 are oxidized. A flow of electrons 30 is conducted to an electrical load 32 via an electrical circuit (not shown). The electrical circuit maintains the flow of electrons 30 from the anode 14 to the electrical load 32 and continues to the cathode 16, where the electrons react with the oxygen 26 in the oxidant 20.

Throughout the operation of the fuel cell unit 10, the temperature of reformate 18 entering the fuel cell, is a parameter that impacts system performance. The high temperature operation of the SOFC is sensitive to operating temperature. In some system configurations, a ten percent drop in temperature results in about twelve percent drop in cell performance due to increase in internal resistance to the flow of oxygen ions. The more rapidly reformats 18 is provided to the fuel cell unit 10 at the proper temperature, the more quickly the fuel cell unit 10 will perform efficiently.

To facilitate the reaction in the fuel cell 10, a direct supply of the fuel, such as hydrogen, carbon monoxide, or methane, is preferred. However, concentrated supplies of these fuels are generally expensive and difficult to supply. Therefore, the specific fuel can be supplied by processing a more complex source of the fuel. The fuel utilized in the system is typically chosen based upon the application, expense, availability, and safety issues relating to the fuel. Possible sources of fuel include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative fuels, such as hydrogen, biofuels, dimethyl ether, and others; and combinations comprising at least one of the foregoing fuels. The preferred fuel is typically based upon the power density of the engine, with lighter fuels, i.e., those which can be more readily vaporized and/or conventional fuels which are readily available to consumers, generally preferred.

The processing or reforming of hydrocarbon fuels, such as gasoline, is completed to provide an immediate fuel source for rapid start-up of the fuel cell as well as protecting the fuel cell by removing impurities. Fuel reforming can be used to convert a hydrocarbon (such as gasoline) or an oxygenated fuel (such as methanol) into hydrogen ($H_2$) and byproducts (e.g., carbon monoxide (CO) and carbon dioxide ($CO_2$)). Common approaches include steam reforming, partial oxidation, and dry reforming.

Steam reforming systems involve the use of a fuel and steam ($H_2O$) that is reacted in heated tubes filled with catalysts to convert the hydrocarbons into principally hydrogen and carbon monoxide. An example of the steam reforming reaction is as follows:

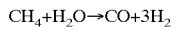

$$CH_4 + H_2O \rightarrow CO + 3H_2$$

Partial oxidation reformers are based on substoichiometric combustion to achieve the temperatures necessary to reform the hydrocarbon fuel. Decomposition of the fuel to primarily hydrogen and carbon monoxide occurs through thermal reactions at high temperatures of greater than about 500 degrees centigrade, with about 750 to about 900 degrees centigrade being preferred. The thermal energy required to drive the reaction is typically supplied by burning a portion of the fuel. Catalysts have been used with partial oxidation systems (catalytic partial oxidation) to promote conversion of various sulfur-free fuels, such as ethanol, into synthesis gas. The use of a catalyst can result in acceleration of the reforming reactions and can provide this effect at lower reaction temperatures than those that would otherwise be required in the absence of a catalyst. An example of the partial oxidation reforming reaction is as follows:

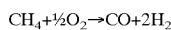

$$CH_4 + \tfrac{1}{2}O_2 \rightarrow CO + 2H_2$$

Dry reforming involves the creation of hydrogen and carbon monoxide in the absence of water, for example using carbon dioxide. An example of the dry reforming reaction is depicted in the following reaction:

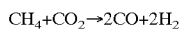

$$CH_4 + CO_2 \rightarrow 2CO + 2H_2$$

As previously stated, the fuel cell and the reformer can be used to operate in multiple start-up and shut down cycles. The deficiency of the relatively large mass of the catalytic reformer is that it does not come up to a temperature rapidly enough to generate soot free reactions, and produces fouling soot on cold start-up. A reformer can be efficiently operated more rapidly if it has less mass to heat at start-up. However, reducing the mass of the reformer is limited. The reformer has a minimum size limitation because the reformer must be capable of processing a large enough quantity of fuel into reformate for a given size fuel cell. By employing a reformer with a relatively smaller mass in series with a reformer sized for the production of reformate for the fuel cell, the start-up time to process fuel can be accelerated. The smaller reformer, hereinafter a micro-reformer, can be employed. The micro-reformer, which can be many types of reformer, or catalytic or gas phase combustor, is preferably an exothermic partial oxidation reformer. Since this micro-reformer produces thermal energy and reformate the combination can be employed to heat or otherwise bring the various systems up to the desired temperature.

Figure 2:
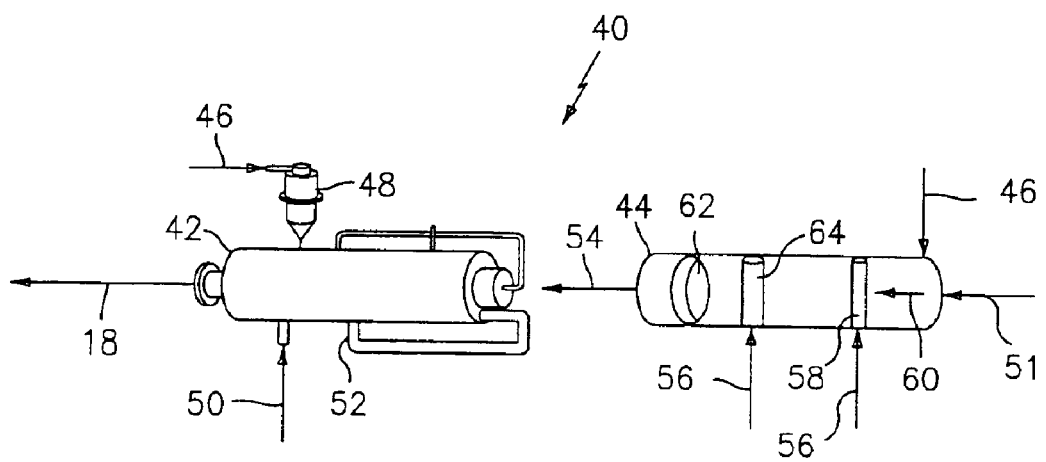
FIG. 2 is a perspective view of an exemplary embodiment of a reformer system with a micro-reformer.

FIG. 2, shows an arrangement of a reformer system 40 that produces reformate 18 (hydrogen and carbon monoxide concentrations) for the fuel cell unit 10 (not shown). The reformer system 40 has a reformer 42 and, a micro-reformer 44. The reformer 42 and the micro-reformer 44 can individually comprise any conventional type of reformer. In one embodiment, the reformer 42 can be a steam reformer or a dry reforming type reformer employing endothermic reactions. The micro-reformer 44 can be a partial oxidation reformer employing exothermic reactions.

The micro-reformer 44 is sized to provide sufficient heat and sufficient reformate to pre-heat and start-up the downstream reformer 42 in the desired period of time. The micro-reformer 44 is generally a fraction of the size of the downstream reformer 42 and is designed differently. There is about a four to one ratio in catalyst volume of a reformer 42 to a micro-reformer 44. The peak operating temperature for a micro-reformer is less than a reformer (i.e., about 825° C. vs. about 950° C.).

The reformer 42 can comprise a variety of inputs which can be controlled to optimize reformer response-time. Prior to introducing fuel via a fuel injector 48 or air 50, preheated reformate 54 can be introduced to a reforming catalyst 52 disposed within the catalyst bed. Once the preheated reformate 54 raises the catalyst bed temperature above a temperature that will allow the reformer to be started without soot production (e.g., to a temperature of about 200 degrees centigrade or greater), air 50, then fuel 46, then water or recycled exhaust (not shown) can be introduced to the reformer 42.

The reformer 42 has a catalytic reformer bed called the reforming catalyst 52. Heating the reforming catalyst 52 before reactants contact the reforming catalyst 52 improves the response time of the reformer 42 to produce reformate 18. Providing the reformer 42 with preheated reformate 54 improves the start-up time thereof. The preheated reformate 54 can reduce the soot production and subsequent fouling of the reforming catalyst 52 that can occur on a rapid start-up.

The micro-reformer 44 is in fluid communication with the reformer 42 such that a preheated reformate 54 flows from the micro-reformer 44 to the reformer 42. The micro-reformer 44 has inputs of (liquid) fuel 46 and air 51, as well as electrical energy 56. Disposed within the micro-reformer 44 can be a vaporizer 58 and a catalyst 62. Typically the catalyst 62 is mounted inside the micro-reformer 44 downstream of the vaporizer 58 so that a fuel air mixture 60 can gain thermal energy before approaching the catalyst 62. A preheater 64 can be disposed adjacent the catalyst 62. The preheater 64 provides thermal energy to the catalyst 62 to preheat the catalyst 62 in order that a more rapid and efficient start-up of the micro-reformer 44 can occur. A more rapid start-up of the micro-reformer 44 in turn provides a more rapid start-up of the reformer 42.

In a fuel cell unit 10, electrical energy is rapidly available and converted to thermal energy with high efficiency. In the micro-reformer 44, rapid transfer of thermal energy to the fuel air mixture 60 enhances the start-up time and efficiency of the micro-reformer. Therefore, the micro-reformer 44, in one embodiment, is electrically preheated to produce the preheated reformate 54 for the reformer 42.

The vaporizer 58, the preheater 64 and the catalyst 62 can be configured to convert electrical energy into thermal energy.

Figure 3:
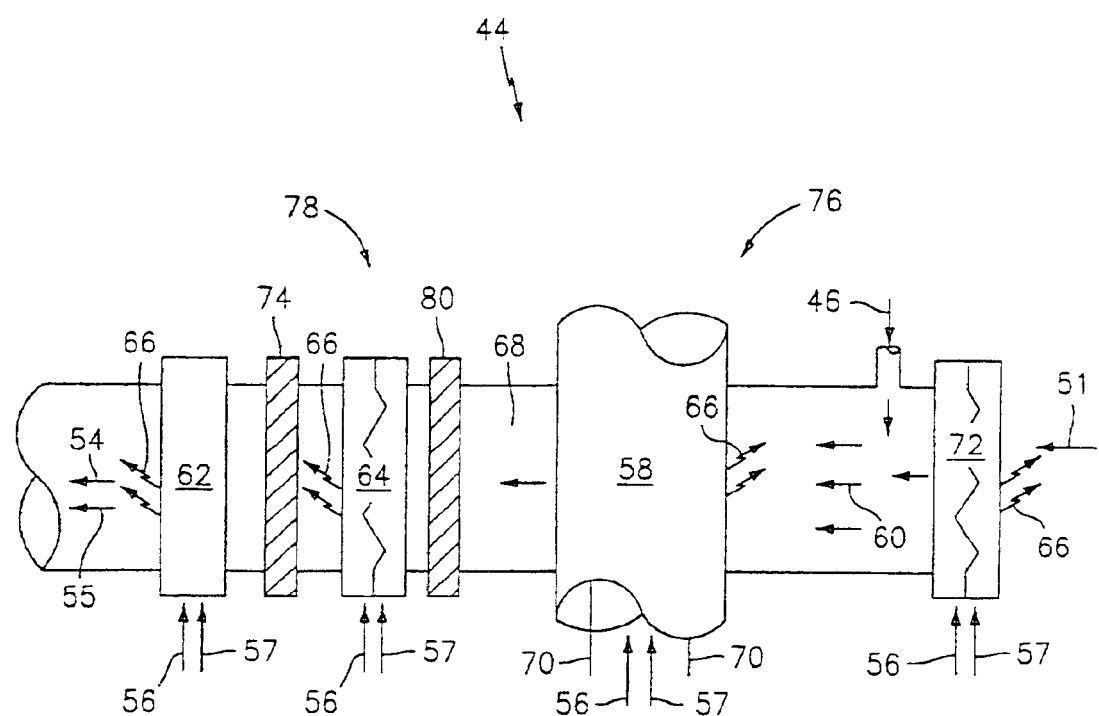
FIG. 3 is a schematic diagram of an exemplary embodiment of a micro-reformer.

Referring to FIG. 3, a diagram of an exemplary embodiment of the micro-reformer 44 is shown. As stated above, the micro-reformer 44 has inputs of fuel 46, air 51 and electrical energy 56. The micro-reformer produces preheated reformate 54 that can be supplied to the reformer 42 (see FIG. 2). The basic process of producing the preheated reformate 54 is now described. As shown in FIG. 3, the micro-reformer 44 has a vaporizer 58 and a preheater 64 disposed upstream of the catalyst 62. The fuel 46 and air 51 enter the microreformer 44 and become mixed to form the fuel air mixture 60. The fuel air mixture 60 passes over and contacts the vaporizer 58 and gains thermal energy 66. The fuel air mixture 60 moves downstream of the vaporizer 58 to a mixing zone 68 to become more thoroughly mixed. The fuel air mixture 60 contacts the catalyst 62 and reacts to form preheated reformate 54. The preheated reformate 54 is discharged from the micro-reformer 44 to the reformer 42 (see FIG. 2).

The vaporizer 58 can be an element that transfers thermal energy to the fuel 46 and air 50 in the flow stream of fuel air mixture 60. The vaporizer, in another embodiment, can include a passive device (not shown) which allows residence time, surface area and mixture motion to mix the air 51 and fuel 46. The vaporizer 58 can be an element that is made of a variety of materials and shapes that convert electrical energy to thermal energy. The vaporizer 58 can optionally be a positive temperature coefficient of resistivity ceramic element (PTC). The vaporizer 58 has electrical switching characteristics that allow the vaporizer 58 to switch at certain temperatures. PTC materials are self-regulating due a sharp nonlinearity of resistance as a function of temperature. Metal resistance heater materials need to have a temperature transducer and control circuit to regulate at a desired temperature. The vaporizer 58 can be doped to have switching properties to switch at temperatures from about 70 degrees centigrade to about 250 degrees centigrade. The vaporizer 58 can operate from the electrical energy 56 at any range of voltage. This allows the vaporizer 58 to be used in harmony with various vehicle electrical systems. For example, the electrical power in one embodiment can be 40 volts direct current in another embodiment the electrical power can be 13 volts direct current. The vaporizer 58 can be capable of generating thermal energy from electrical energy 56 to generate the desired temperature of about 70 degrees centigrade to about 250 degrees centigrade (depending on the fuel).

In one embodiment, the vaporizer 58 can be an electric metal resistance heater. The metal resistance heater is dissimilar to the ceramic material vaporizer 58 with regard to temperature stability and resistance to corrosion. In the ceramic material version, the positive temperature coefficient of resistivity ceramic material of the vaporizer 58 can comprise a porous material. The material makeup of the vaporizer 58 in another embodiment can be barium titanate modified by the addition of lead titanate. The addition of lead titanate improves the switching characteristics. Dopants and counter dopants can be added to adjust the electrical properties of the vaporizer 58. Flourine can be added to enhance the thermal stability and corrosion resistance.

The vaporizer 58 can be processed in a variety of processes. Binder coagulation casting (BCC) is a preferred method. BCC is ideally suited for the fabrication of PTC elements because of the ease of batch preparation and the low cost of tooling. Ferroelectric materials are compatible with the BCC technique. A barium titanate powder can have polymer microspheres incorporated as a method to form a desired pore structure in the PTC element. Another embodiment of fabrication of the vaporizer 58 is by extrusion. An extruded ceramic honeycomb structure can be used in one embodiment.

A cylindrical shaped vaporizer 58 with a diameter of about 1 centimeter can be employed. The ceramic cylinder can be nested in a metal tube. An epoxy binds the ceramic cylinder in the metal tube in one embodiment. Electrodes 70 are attachable to the vaporizer 47. In one embodiment a silver paste couples the electrodes 70 to the vaporizer 58. The geometry of the electrode 70 is such that there is a uniform electric field along the length of the vaporizer 58.

Downstream of the vaporizer 58 is a mixing zone 68. The mixing zone 68 preferably thoroughly mixes the fuel air mixture 60 after the fuel air mixture 60 gains thermal energy 66 from the vaporizer 58. The mixing zone 68 can be a location that provides for relative turbulent flow to mix the fuel air mixture 60. The mixing zone 60 can be a variety of baffles or a porous structure that provides both voids and impingement sections to create a mixing environment. The mixing zone 68 can comprise ceramic foam material.

As stated above, the preheater 64 converts electrical energy 56 into thermal energy 66 and transfers the thermal energy 66 to the catalyst 62. In order to convert the electrical energy 56 into thermal energy 66, the preheater 64 can have similar properties as the vaporizer with the exception that the preheater 64 operates at relatively higher temperatures, e.g., about 500 degrees centigrade. The preheater 64 can comprise a metal resistive heating element. The preheater 64 in another embodiment can be made of catalytic materials. However the catalyst 62 is the primary element for reacting the fuel air mixture 60.

The catalyst 62 preferably is disposed in the micro-reformer 44 downstream of the vaporizer 58 and mixing zone 68. The fuel air mixture 60 reacts at the catalyst 62 to become reformate 54.

The catalyst 62 can be heated by external sources, internal sources of thermal energy or both internal and external sources. If the catalyst 62 employs exothermic reactions, then as a result of the catalytic reactions at the catalyst 62, thermal energy can be generated and heat the catalyst 62. The catalyst 62 can be equipped with an internal heater e.g., a heating element (not shown). The catalyst 62 can be heated by an external source such as the preheater 64. The catalyst 62 can also be heated by both an internal heater and by thermal energy 66 transferred from the preheater 64.

In one embodiment, the catalyst 62 can be electrically preheated such that the catalyst 62 is heated prior to reaction with the fuel air mixture 60. In another embodiment the catalyst 62 can be preheatable by employing a heating element to heat a portion of its structure. The catalyst 62 can be equipped with heating elements in portions of its structure to convert electrical energy 56 to produce the thermal energy 66 required to preheat the catalyst 62. The catalyst can be placed at a location proximate to the preheater 64 such that only a portion of the catalyst 62 is preheated.

The micro-reformer 44 can be operated by first electrically preheating the vaporizer 58, the preheater 64 and/or the catalyst 62. Electrical preheating can be completed prior to the introduction of air 51 or fuel 46 into the micro-reformer 44. Electrical preheating can be instantaneous or continuous. A system of instrumentation and controls (not shown) can be incorporated into the micro-reformer 44 that provides for commencing the electrical preheat prior to the injection of fuel 46 and air 51. The preheater 64 can be controlled to modulate the quantity of thermal energy 66 transferred to the catalyst 62. The modulation can maintain the catalyst 62 in a temperature range desirable for the operation of the catalyst. By maintaining the catalyst 62 in a desirable temperature range the micro-reformer 44 can operate more rapidly and efficiently. The modulation can be completed during catalyst start-up to maintain the catalyst 62 in the desired temperature range for soot free start-up with immediately combustible reformats. The temperature range can be determined based on thermo-chemical models of the light-off process of the catalyst 62. A maintained temperature of about 350 to about 500 degrees centigrade or greater can be employed (compared to an operating temperature of about 700 to about 950 degrees centigrade).

In alternative embodiments, the micro-reformer 44 can have additional elements to produce the preheated reformate 54. At the inlet to the air 51, an electric air heater 72 can be added to provide thermal energy 66 to the air 51 entering the micro-reformer 44 upstream of the vaporizer 58. Preheating the air enhances the process of vaporizing the fuel 46. The micro-reformer 44 can also have a flame arrestor 74 disposed between the preheater 64 and the catalyst 62 or upstream of the preheater 64. The flame arrestor 74 serves to protect the catalyst 62 from undesirable gas phase reactions.

An example of the preheated micro-reformer can be described as follows with reference to FIG. 3. In general, the micro-reformer 44 can be divided into two zones, a first zone and a second zone. The first zone 76 (or vaporizer zone), includes components near the electric air heater 72, vaporizer 58 and mixing zone 68. The second zone 78 or (catalyst zone), includes the components near the catalyst 62 and the preheater 64. A thermal barrier 80 can be employed between the first zone 76 and the second zone 78 to maintain the two zones at different temperatures. The first zone 76 can be maintained at a temperature that promotes vaporization, while inhibiting pre-combustion. The second zone 78 can be maintained at a temperature higher than the first zone 76, which can be a temperature that can promote lean combustion or reformats production (rich combustion), while inhibiting soot production or coking.

Employing the general strategy of preheating the micro-reformer 44 in order to rapidly start the micro-reformer 44 with less soot production, alternative sources of thermal energy 57 can be employed. The exemplary embodiment being the use of electrical energy 56 converted to thermal energy 66. In other embodiments employing the alternative sources of thermal energy 57, such as the use of combustion processes to provide thermal energy, or the use of reversible chemical reactions, such as hydrides to provide thermal energy.

Preheating the micro-reformer 44 can also be completed employing the two zones for this example. The thermal energy 66 can be provided to the first zone 76 and the thermal energy 66 can be provided to the second zone 78. The thermal energy source can vary for each zone or it can be uniform. For example, the first zone 76 can be heated by employing electrical energy 56 converted to thermal energy 66, and the second zone 78 can be heated by employing thermal energy 66 provided by the alternative source of thermal energy 57, such as hydrides.

As part of the general strategy for pre-heating the micro-reformer in this example, with a fuel 46 being gasoline or a substantially similar fuel to gasoline, the first zone 76 can be maintained at a temperature at which fuel is vaporized while avoiding pre-combustion of the fuel. When using gasoline, the first zone 76 can be maintained at a temperature of about 70 to about 200 degrees centigrade.

The second zone 78 temperature can be maintained in at least two different modes. The micro-reformer 44 can be used to produce a source of hot gases 55, known as a lean start, or the micro-reformer 44 can be used to produce the preheated reformate 54, known as a rich start. A lean start can be done at a temperature at which substantially all of the hydrocarbons of the fuel are consumed by oxidation. The rich start can be done at a temperature in which reforming reactions occur without substantial coking or soot. The second zone 78 can be maintained at a temperature of about 350 to about 500 degrees centigrade for a lean start and a temperature of about 600 to about 900 degrees centigrade for a rich start. It is understood that the temperatures at which the zones are maintained will vary depending upon the fuel.

By way of this example, the micro-reformer can be employed to operate as follows, with reference to FIG. 3. With the micro-reformer 44 set to go immediately to producing a preheated reformate 54, the two zones can be configured to maintain different temperatures before start-up. The first zone 76 can be preheated by supplying an alternative thermal energy source 57 such as thermal energy from combustion products to the vaporizer 58. The vaporizer 58 can be preheated to a temperature of about 150 degrees centigrade. The second zone 78 can be preheated by supplying electrical energy 56 to the preheater 64 that converts the electrical energy 56 to thermal energy 66 and transfers part or substantially all of the thermal energy 66 to the catalyst 62 and the remaining components in the second zone 78. The second zone 78 can be maintained at temperature of about 700 degrees centigrade. The micro-reformer then introduces fuel 46 and air 51 into the first zone 76. The air 51 and fuel 46 mix and vaporize in the first zone 76 as a result of flowing through the first zone 76. The fuel air mixture 60 enters the second zone 78 where it is reacted into preheated reformate 54. With the first zone 76 and the second zone 78 preheated, the micro-reformer can be employed in a fast start-up substantially minimizing fouling from soot due to insufficient reactions.

Another example of the micro-reformer being employed to operate as a lean combustor can be described as follows with reference to FIG. 3. Before introduction of fuel 46 and air 51 into the micro-reformer 44 the first zone 76 can be preheated by use of supplying electrical energy 56 to the vaporizer 58 and supplying electrical energy 56 to the electric air heater 72. The electrical energy 56 is converted into thermal energy 66. The vaporizer 58 and electric air heater 72 maintain the first zone 76 at a temperature of about 150 degrees centigrade. The second zone 78 can be supplied with electrical energy 56 to both the preheater 64 and a portion of the catalyst 62 to be converted into thermal energy 66 such that the second zone 78 is maintained at a temperature of about 350 to about 500 degrees centigrade. The air 51 and the fuel 46 are input into the first zone 76 to be mixed and vaporized. The fuel air mixture 60 is then introduced into the second zone 78 where the fuel air mixture 60 is combusted with excess air to produce hot gases 55 instead of preheated reformate 54. It is understood that any combination of techniques that transfer thermal energy 66 to the different zones or different components is contemplated for both the generation of hot gases 55 and the generation of preheated reformate 54. It is also contemplated that a variety of active and/or passive devices can be employed to transfer the thermal energy 66 to the two zones.

Employment of the preheated micro-reformer enables the use of heavier weight hydrocarbons without causing system coking, reduces or eliminates the need for alternatives for rapid start-up such as stored hydrogen to heat the main reformer. The use of the preheated micro-reformer is energy efficient, cost effective, and more rapid than conventional practices.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A preheated micro-reformer system comprising:
   a reformer; and
   a micro-reformer in fluid communication with said reformer, said micro-reformer being electrically preheatable.

2. The preheated micro-reformer system as in claim 1, wherein said micro-reformer includes an electrically preheatable vaporizer disposed within said micro-reformer.

3. The preheated micro-reformer system as in claim 2, wherein said vaporizer comprises a porous positive temperature coefficient of resistivity ceramic.

4. The preheated micro-reformer system as in claim 1, wherein said micro-reformer includes a catalyst, said catalyst being electrically preheatable.

5. The preheated micro-reformer system as in claim 4, wherein said micro-reformer includes a preheater, said preheater being electrically preheatable wherein said preheater preheats said catalyst by converting electrical energy into thermal energy.

6. The preheated micro-reformer system as in claim 5, wherein said preheater comprises a catalytic material for reforming a fuel.

7. The preheated micro-reformer system as in claim 5, wherein said preheater has a modulatable thermal energy transfer to said catalyst.

8. The preheated micro-reformer system as in claim 1, further comprising;
   an air heater disposed within said micro-reformer, said air heater being electrically preheatable.

9. The preheated micro-reformer system as in claim 5, further comprising;
   a flame arrester disposed within said micro-reformer between said preheater and said catalyst.

10. A method of using a preheated micro-reformer system comprising:
    preheating said micro-reformer by converting electrical energy into thermal energy;
    introducing fuel and air to said micro-reformer;
    vaporizing said fuel; and
    producing micro-reformer effluent.

11. The method of using a preheated micro-reformer system as in claim 10, wherein said micro-reformer is preheated using an electrically preheatable vaporizer, and an electrically preheatable catalyst.

12. The method of using a preheated micro-reformer system as in claim 11, wherein said electrically preheatable vaporizer comprises a positive temperature coefficient of resistivity ceramic.

13. The method of using a preheated micro-reformer system as in claim 10, further comprising:
    modulating a thermal energy transfer from said preheater to said electrically preheatable catalyst in said micro-reformer wherein said electrically preheatable catalyst is maintained at sufficient temperatures for inhibiting soot formation during operation.

14. An apparatus comprising:
    a micro-reformer including a first zone and a second zone, said first zone being preheatable to a first temperature and said second zone being preheatable to a second temperature, said second temperature being higher than said first temperature.

15. The apparatus of claim 14, wherein said first temperature promotes vaporization of a fuel air mixture, and said second temperature promotes production of reformate.

16. The apparatus of claim 14, wherein said first zone is preheatable similarly to said second zone.

17. The apparatus of claim 16, wherein said first zone is preheatable by converting electrical energy to thermal energy and said second zone is preheatable by converting electrical energy to thermal energy.

18. The apparatus of claim 14, wherein said first zone is preheatable differently than said second zone.

19. The apparatus of claim 18, wherein said first zone is preheatable by converting alternative energy sources to thermal energy and said second zone is preheatable by converting electrical energy to thermal energy.

20. The apparatus of claim 18, further comprising a thermal barrier disposed between said first zone and said second zone, said first zone and said second zone being maintainable at different temperatures.

21. A method of using a preheated micro-reformer comprising:
    preheating a first zone;
    preheating a second zone to a temperature higher than said first zone;
    vaporizing a fuel air mixture in said first zone; and
    reforming said fuel air mixture in said second zone.

22. The method of using a preheated micro-reformer as in claim 21, further comprising:
    supplying electrical energy to said first zone, and converting said electrical energy to thermal energy.

23. The method of using a preheated micro-reformer as in claim 21, wherein the step of preheating said second zone is from a different source of thermal energy than preheating said first zone.

24. The method of using a preheated micro-reformer as in claim 21, further comprising:
    maintaining said first zone and said second zone at different temperatures.

25. The method of using a preheated micro-reformer as in claim 21, further comprising:
    maintaining said first zone at a first temperature for vaporizing a fuel air mixture without precombustion; and
    maintaining said second zone at a second temperature for reforming said fuel air mixture into preheated reformate.

26. The method of using a preheated micro-reformer as in claim 21, further comprising:
    maintaining said first zone at a first temperature for vaporizing a fuel air mixture without precombustion; and
    maintaining said second zone at a second temperature to combust said fuel air mixture with excess air into hot gases.

27. A preheated micro-reformer comprising:
    a means for preheating a first zone;
    a means for preheating a second zone to a temperature higher than said first zone;
    a means for vaporizing a fuel air mixture in said first zone; and
    a means for reforming said fuel air mixture in said second zone.

28. The preheated micro-reformer as in claim 27, further comprising:

a means for supplying electrical energy to said first zone, and converting said electrical energy to thermal energy.

29. The preheated micro-reformer as in claim 27, further comprising:

a means for maintaining said first zone and said second zone at different temperatures.

30. The preheated micro-reformer as in claim 27, further comprising:

a means for maintaining said first zone at a first temperature for vaporizing a fuel air mixture without precombustion; and a means for maintaining said second zone at a second temperature for reforming said fuel air mixture into preheated reformate.

* * * * *